United States Patent [19]
Cok

[11] Patent Number: 5,185,808
[45] Date of Patent: Feb. 9, 1993

[54] METHOD FOR MERGING IMAGES

[75] Inventor: David R. Cok, Rochester, N.Y.

[73] Assignee: Eastman Kodak Company, Rochester, N.Y.

[21] Appl. No.: 710,873

[22] Filed: Jun. 6, 1991

[51] Int. Cl.⁵ .............................................. G06K 9/00
[52] U.S. Cl. ........................................ 382/1; 358/183; 382/22; 395/135
[58] Field of Search ............... 382/1, 22, 27; 358/181, 358/183; 395/126, 135

[56] References Cited

U.S. PATENT DOCUMENTS

| | | | |
|---|---|---|---|
| 3,941,925 | 3/1976 | Busch et al. | 178/6.8 |
| 3,989,888 | 11/1976 | Busch et al. | 178/6.8 |
| 4,038,668 | 7/1977 | Quarton | 235/151 |
| 4,199,788 | 4/1980 | Tsujimura | 358/183 |
| 4,356,511 | 10/1982 | Tsujimura | 358/181 |
| 4,484,187 | 11/1984 | Brown et al. | 340/703 |
| 4,551,856 | 11/1985 | Victor et al. | 455/183 |
| 4,602,286 | 7/1986 | Kellar et al. | 358/183 |
| 4,679,039 | 7/1987 | Neill et al. | 340/728 |
| 4,764,809 | 8/1988 | Haycock et al. | 358/183 |
| 4,800,511 | 1/1989 | Tanaka | 364/521 |
| 4,811,245 | 3/1989 | Bunker et al. | 364/521 |
| 4,814,884 | 3/1989 | Johnson et al. | 358/183 |
| 4,827,344 | 5/1989 | Astle et al. | 358/183 |
| 5,022,085 | 6/1991 | Cok | 395/135 |

Primary Examiner—Leo H. Boudreau
Attorney, Agent, or Firm—Edward Dugas

[57] ABSTRACT

An imagery data mechanism for controllably merging separate, digitally formatted and arbitrarily shaped images eliminates overlap-edge artifacts by gradually blending a paste image (40) along its border (44) with a base image (30), regardless of the shape of the paste image. The mechanism employs a 'feathering' window (50) containing a plurality of neighboring pixel locations over which the pixel values of the paste image are controllably modified as to their transparency to achieve a tapered blending of the two images. Whether data value of any pixel within the display is to be modified from a given database value will depend upon whether or not that pixel location is both within the paste image and a prescribed distance to the border (44) of the paste image. If the pixel location is not part of the image, it is effectively masked, so that not only does feathering not take place, but neither the base image nor the paste image contributes to its data value.

11 Claims, 2 Drawing Sheets

METHOD FOR MERGING IMAGES

CROSS-REFERENCE TO RELATED APPLICATIONS

The subject application is related to U.S. patent application Ser. No. 529,797, filed May 29, 1990, entitled "Neighborhood-Based Merging of Image Data", now U.S. Pat. No. 5,022,085.

FIELD OF THE INVENTION

The present invention relates in general to digital image processing and more particularly is directed to a method for combining two images by modifying a mask that indicates the proportions by which the two images are to be mixed. BACKGROUND OF THE INVENTION In computer-based image composition and editing systems, which store imagery data in digital format, it is common practice to selectively combine plural images by merging or inserting a first image, termed the "paste" image, into or on top of a second image termed the "base" image. Both the "paste" image and the "base" image may be of arbitrary shape. Because the images are different, along the edge or border between the base image and the paste image, an undesirable boundary artifact is created. This anomaly is particularly pronounced where the border has an arbitrary shape, due to the quantized format of the image data base and the finite matrix configuration of the display pixels. One possible mechanism for reducing the artifact is to locally blur the edge of the paste image, so as to 'soften' the effect of the image discontinuity. It has been found, however, that such a solution simply produces the obvious—a pasted image with a blurred border. An improved solution should provide the following features:

a) With the use of a mask solution the value of the mask should reduce to zero as it approaches the edge of the region being pasted.

b) The mask should be unchanged where the edge of the mask coincides with the edge of the image.

c) The method should be applicable to irregularly shaped masks and images.

d) The method should be applicable to non-binary masks which already indicate a degree of transparency of the merging process.

e) The method should support varying degrees of feathering.

f) The method should be able to be efficiently implemented in a general purpose digital processor.

g) The method should work acceptably for any shape of boundary.

The present invention provides the aforementioned features to the problem.

SUMMARY OF THE INVENTION

In accordance with the present invention, there is provided a mechanism for controllably merging separate, digitally formatted and arbitrarily shaped images in a manner which effectively eliminates the above-mentioned artifact and performs a gradual blending of the overlay, or paste, image along its border with the base image, regardless of the shape of the paste image. To this end, the image processing mechanism of the present invention employs a method of combining the two images by modifying the mask which indicates the proportions by which to mix the two images. This permits the operation to be computed using only local information within the image. By representing the shape of the paste and base images as additional masks, any shape of image can be accommodated. In particular, the method works even around acute angles in the boundary. The method inherently depends on a variable parameter (the feathering distance) which gives control over the amount of feathering which will be obtained. The amount of feathering applied to a given pixel is dependent on the distance that the pixel is from the edge of the paste image (where that does not coincide with an edge of the base image). For a pixel right next to the edge, the mask value is reduced nearly to zero; for a pixel that is far from the edge (more than the feathering distance), the mask value is unchanged.

From the foregoing it can be seen that it is a primary object of the present invention to provide an improved mechanism for pasting one digital image onto another.

It is a further object of the present invention to provide a mechanism for digital image pasting that works for any shape of image. Yet another object of the present invention is to provide a method for image pasting that is particularly adapted for implementation on a general purpose digital image processor.

These and other objects of the present invention will become more apparent when taken in conjunction with the following description and drawings wherein like characters indicate like parts and which drawings form a part of the description of the invention.

DETAILED DESCRIPTION OF THE INVENTION

Figure 1:
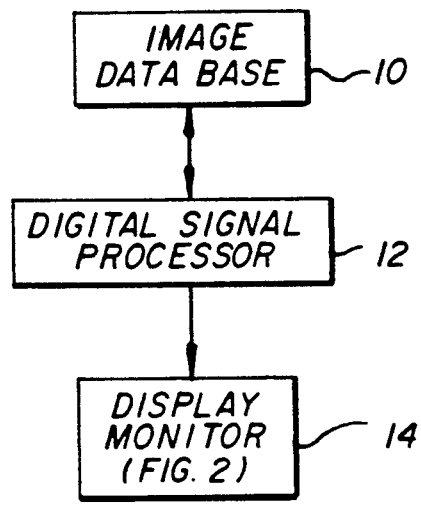
FIG. 1 diagrammatically shows a digital image processing system for merging plural images.

Before describing the details of an embodiment of the present invention, it should be observed that the invention resides primarily in a novel imagery data processing mechanism, rather than a particular implementation of that mechanism. Thus, although, in its preferred embodiment, the invention is implemented using a programmed digital computer, the paste image border feathering mechanism may be carried out by means of a variety of structural combinations of conventional signal processing circuits and components, such as custom configured integrated circuit hardware. Accordingly, the structure, control and arrangement of the signal processing hardware of an embodiment of the invention have been illustrated in the drawings by a readily understandable block diagram, which shows only those specific details that are pertinent to the present invention, so as not to obscure the disclosure with structural details which will be readily apparent to those skilled in the art having the benefit of the present description.

Referring now to FIG. 1, an image data processing system is diagrammatically shown as comprising an image data base 10 that contains a plurality of digitally encoded images, portions of or the entireties of which may be selectively accessed by an attendant digital signal processor 12 for display upon an associated display device, such as a high resolution color pixel monitor 14. The images stored in data base 10 may have been obtained from a color image transducer device, such as a digital RGB video camera or color scanner that generates image characteristic-representative digital signals, such as respective red, green and blue channel signals that are representative of the red, green and blue color band components of a color image or other forms of digital images may also be processed by the present invention.

Figure 2:
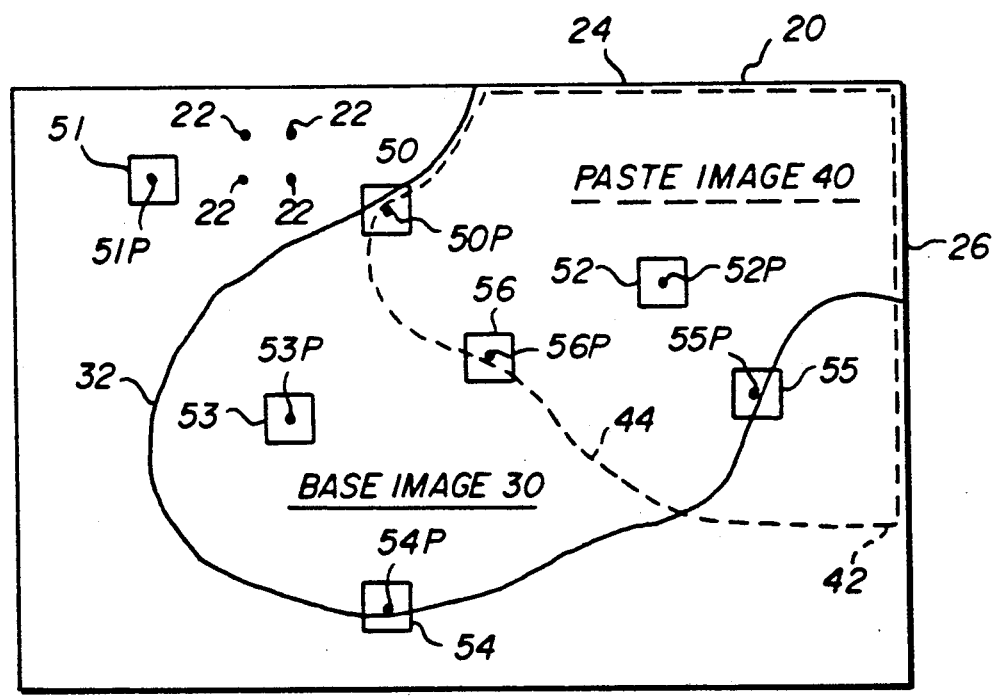
FIG. 2 diagrammatically illustrates an exemplary image matrix containing a base image and an overlayed paste image, the edge of which is to be feather-blended with the base image.

For purposes of providing a simplified illustration of an embodiment of the present invention, the display screen of monitor 14 is depicted in FIG. 2 as containing an array 20 of pixels 22 that are controllably energized in accordance with the image data stored in the image data base 10, in order to display a first, or base, image 30, as having a solid line border 32, and a second, or paste, image 40, shown as having a broken line border 42. Paste image 40 partially overlaps base image 30 along an overlap edge 44 and, like base image 30, extends to an upper edge 24 and a right-hand edge 26 of matrix 20. Also shown as being distributed throughout the pixel matrix of FIG. 2 are a plurality of arbitrarily located 'feathering' windows 50-56, highlighted within which are respective pixel locations 50p-56p of array 20. As will be described below, the data value used to control the energization of a respective pixel within array 20 is governed by attributes of a neighborhood of pixels surrounding the pixel of interest, the neighborhood location and boundaries of that neighborhood being defined by a 'feathering' window, such as windows 50-56.

More particularly, in order to achieve a gradual blending of the paste image along its edge where it overlaps the base image, the present invention employs a 'feathering' window, which encompasses a plurality of neighboring pixel locations over which the pixel values of the paste image are controllably modified in a gradual manner to effect a tapered blending of the two images. Whether the data value for any pixel (i,j) within the display is to be modified from that supplied by a given database value (e.g. an overlay value) will depend upon whether or not that pixel location is both within the paste image and a prescribed distance from its border with the base image. The prescribed distance is defined by the size of the feathering window and extends over a prescribed plurality f of pixels, the number of which is sufficient to achieve a smooth blending of the base and paste images along the interface between the two. The size of the feathering window may be varied to provide either a gradual blending (for large values of f) or a sharp transition (for small values of f) interface between the paste and base images.

Figure 3:
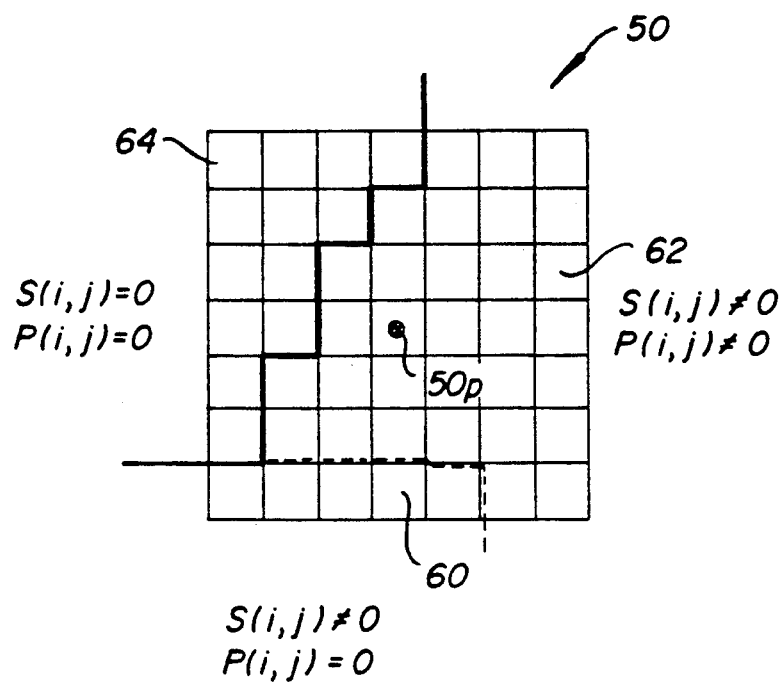
FIG. 3 shows an enlargement of a feathering window 50 in the image matrix of FIG. 2.

FIG. 3 shows an enlargement of feathering window 50 which, for purposes of simplification is shown as having equal vertical and horizontal dimensions of f pixel locations on either side of the pixel 50p of interest, so as to define a square window that surrounds pixel location 50p and encompasses a portion 60 of base image 30, a portion 62 of paste image 40 and a portion 64 of the pixel matrix that lies outside of both the base and paste images, where no image is displayed.

As pointed out above, the size of the feathering window determines the feathering distance, namely within what portion of the paste image pixel data values are to be modified. The feathering distance covers f pixels, so that only those pixels that are within a span of f pixel locations from the border between the paste image and the base image will be modified or 'feathered'. Beyond a distance of f pixels from its edge, the full value of the paste image (absent any ghosting) is employed. Because the feathering distance is f pixels, each side of the feathering window extends a distance of 2f+1 pixels to ensure that the window will always encompass the border for any pixel location within feathering distance f from the border.

Figure 4:
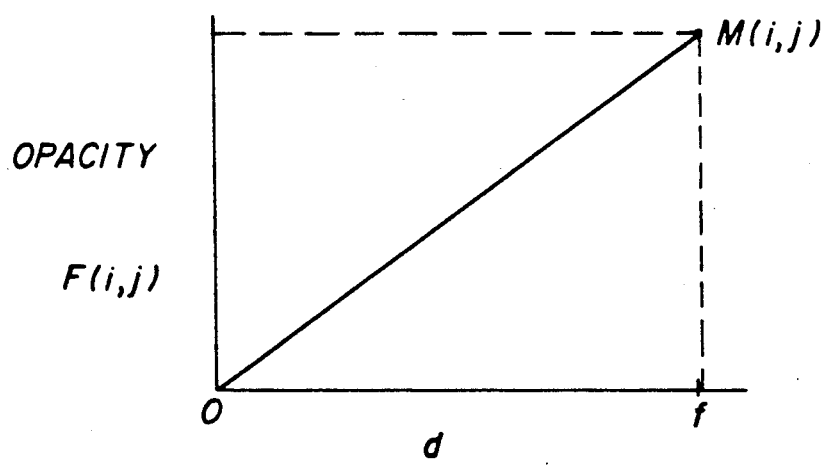
FIG. 4 shows a graphical relationship between the feathering coefficient and the distance of the nearest off the mask pixel.

FIG. 4 illustrates that the transparency value applied to a pixel value decreases as its position approaches the feathering distance f.

The composite image is constructed according to the following procedure. The digital values of the base and the paste images are described using a two dimensional coordinate system with coordinates i,j. The coordinates are all measured with respect to the final composite image.

$B(i,j)$ = the color pixel value of the base image at pixel location (i,j).

$P(i,j)$ = the color pixel value of the paste image at pixel location (i,j).

Since the base and the paste images can be arbitrarily shaped two masks are defined as:

$S(i,j)$ = this mask has the value $MASK_{13}ON$ if (i,j) is a pixel of the base image and a value of zero if (i,j) is not a pixel of the base image.

$M(i,j)$ = this mask has a value MASK_ON if (i,j) is a pixel location where the paste image is being inserted into the base image and a value of zero where the base image is to be retained. The mask has an intermediate value where the paste and the base images are to be mixed to indicate a degree of transparency.

Typically MASK_ON would have a value of 128.

The straightforward merging of the two images would produce a composite image with pixel values:
$C(i,j) = (B(i,j)*(MASK\_ON-M(i,j)) + P(i,j)*M(i,j))/MASK\_ON$ The present invention merges the two images according to the formula:

$$C(i,j) = (B(i,j)*(MASK\_ON-F(i,j)) + P(i,j)*F(i,j))/MASK\_ON$$

Where the value $F(i,j)$ is determined as follows for a feather distance f:

$F(i,j) = (d/f)*M(i,j)$, where d is the distance to the nearest pixel i',j' within a distance f of pixel i,j for which $M(i',j')$ is zero but $S(i',j')$ is not zero. If there is no such pixel within the distance f, set the value of d to f.

Distance is measurable in a number of ways, but an adequate and computationally simple value for the distance between pixel i,j and pixel i',j' is $$|i-i'| + |j-j'|$$

Thus the pixels $(i+1,j)$, $(i-1,j)$, $(i,j+1)$ and $(i,j-1)$ are 1 unit away from (i,j) and the pixels $(i+2,j)$, $(i+1,j+1)$, $(i,j+2)$, $(i-1,j+1)$ $(i-2,j)$ $(i-1,j-1)$, $(i,j-2)$, and $(i+1,j-1)$ are 2 units away from (i,j). Other possible distance measures are (but not limited to) the Euclidean metric $[(i-i')^2+(j-j')^2]^{\frac{1}{2}}$ and the 8-neighbor matric $\max(i-i', j-j')$ An examination of the interior of feathering window 50, shown in enlarged detail in FIG. 3 for a feathering distance f=3, shows that the region 60 is a distance of 2 pixels away from the point 50p. Although the region 64 is only one pixel away, it does not enter into the computation because S(i,j)=0 in this region. The only relevant points for determining distance are those of region 60 which has S(i,j)≠0 but P(i,j)=0. The value of F(50p) would be (⅔)MASK_ON in this example.

For most of the other windows 51-56 that have been illustrated in FIG. 2, there is no feathering of their respective highlighted pixel locations. For example, the entirety of window 52 is located inside paste image 40. Therefore, d/f=1 and F(52p)=MASK_ON (if there is no ghosting). The composite data value of pixel 52p is:

$$C(52p)=(B(52p)*((MASK\_ON\text{-}MASK\_ON)=0)+P(52p)*(MASK\_ON)/MASK\_ON, \text{ i.e. } P(52p).$$

Similarly, the entirety of window 53 is located inside base image 30 but outside the pasted image. Thus, d/f=0 and F(53p)=0. Accordingly, the data value of its highlighted pixel 53p is:

$$C(53p)=(B(53p)*(MASK\_ON\text{-}(F(53p)=0))+(P(53p))*F(53p))/MASK\_ON, \text{ i.e. } B(53p).$$

For feathering window 54, which partially overlaps base image region 30 and the no-image region, d/f=0 and F(54p)=0. Thus, the data value of pixel p54, which lies within the base image region 30, is:

$$C(54p)=(B(54p)*(MASK\_ON\text{-}(F(54p)=0))+(P(54p))*F(54p)=0))/MASK\_ON, \text{ i.e. } B(54p).$$

Likewise, for feathering window 55, which partially overlaps paste image region 40 and no image, d/f=1 and F(i,j)=MASK_ON (absent ghosting), so that the data value of pixel 55p, which lies within the paste image region 40, is:

$$C(55p)=((B(55p)=0))*((MASK\_ON\text{-}MASK\_ON)=0)+P(55p)*MASK\_ON, \text{ i.e. } P(55p).$$

Finally, for window 56, which overlaps base image 30 and paste image 40, d/f is some value between 0 and 1 and the data value of pixel 56p, which falls within paste region 40, is therefore feathered:

$$C(56p)=(B(56p)*(MASK\_ON\text{-}F(56p))+P(56p)*F(56p))/MASK\_ON.$$

As will be appreciated from the foregoing description, the present invention provides a mechanism for controllably merging separate, digitally formatted images in a manner which effectively eliminates overlap-boundary artifacts and achieves a gradual blending of the overlay, or paste, image along its border with the base image, regardless of the shape of the paste image. The effect of the feathering operation is reduced (to zero) as one approaches the border between the paste image and the base image from the paste image side and is maintained at the zero value along the border. By use of the transparency mask M, the combining operation is applicable to non-binary imaging masks which effect some degree of transparency when merging images, and the amount of feathering may be varied by adjusting the size of the feathering window.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with an imagery data base in accordance with which an array of pixels of an image display device is controllably energized to display an image, a method of controllably combining first imagery data, associated with a first, overlap image, with second imagery data, associated with a second, base image, so as to effect a smooth blending of said first image along its border with said second image comprising the steps of:
    (a) for a respective pixel location (i,j) of said array, defining the border of a window that encompasses a plurality of pixel locations surrounding said pixel location (i,j);
    (b) in response to said respective pixel location (i,j) being contained within said first image and the border of said window, defining a first weighting value F(i,j) in accordance with the distance from the location (i,j) to the nearest pixel in the second image which is not in the first image; and
    (c) defining an imagery data value associated with said pixel location (i,j) in accordance with a prescribed combination of said first weighting value and imagery data values contained within said first and second imagery data for said pixel location (i,j).

2. A method according to claim 1, wherein step (b) comprises defining said first weighting value F(i,j) in accordance with a prescribed combination of distances and a second weighting value M(i,j) representative of transparency.

3. A method according to claim 2, wherein step (b) comprises defining said first weighting value F(i,j) in accordance with a product of the ratio of the distance to the closest pixel of said second base image, that is not overlapped, and a distance to the border of said window and said second weighting value.

4. A method according to claim 1, wherein step (b) further comprises setting said first weighting value F(i,j) equal to zero, in response to said respective pixel location (i,j) being contained within said second image, but outside said first image.

5. A method according to claim 1, wherein step (c) comprises defining an imagery data value associated with said pixel location (i,j) in accordance with the sum of a first product of a first imagery data value and a first expression containing said first weighting value and a second product of a second imagery data value and a second expression containing said first weighting value.

6. For use with an imagery data base in accordance with which an array of pixels of an image display device is controllably energized to display an image, a method of controllably combining first imagery data associated with a first, overlap image with second imagery data associated with a second, base image, so as to effect a smooth blending of said first image along its border with said second image comprising the steps of:
    (a) for a respective pixel location (i,j) of said array, defining a window that encompasses a plurality of pixel locations surrounding said pixel location (i,j);
    (b) determining whether or not said respective pixel location is contained within said first image;
    (c) for the window defined in step (a), determine the distance f from the pixel location (i,j) to the border of the window, within the overlapping region of the first and the second image and a distance d to the border of the first and second image to form a ratio d/f;

(d) in response to said respective pixel location (i,j) being contained within said first image, defining a first weighting value F(i,j) in accordance with the ratio d/f determined in step (c); and (e) defining an imagery data value associated with said pixel location (i,j) in accordance with a prescribed combination of said first weighting value and imagery data values contained within said first and second imagery data for said pixel location (i,j).

7. A method according to claim 6, wherein step (d) comprises defining said first weighting value F(i,j) in accordance with a prescribed combination of said ratio and a second weighting value M(i,j) representative of a prescribed degree of transparency.

8. A method according to claim 6, wherein step (d) comprises defining said first weighting value F(i,j) in accordance with a product of said ratio and said second weighting value.

9. A method according to claim 6, wherein step (d) further comprises setting first weighting value F(i,j) equal to zero, in response to step (c) determining said respective pixel location (i,j) to be contained within said second image, but outside said first image.

10. A method according to claim 6, wherein step (e) comprises defining an imagery data value associated with said pixel location (i,j) in accordance with the sum of a first product of a first imagery data value and a first expression containing said first weighting value and a second product of a second imagery data value and a second expression containing said first weighting value.

11. For use with an imagery data base in accordance with which an array of pixels of an image display device is controllably energized to display an image, a method of controllably combining first imagery data associated with a first, overlap image with second imagery data associated with a second, base image, so as to effect a smooth blending of said first image along its border with said second image comprising the steps of:

determining the distance of a pixel to the overlapping border of the first and the second image; and applying a transparency value to the pixel as a function of its distance from the border such that the transparency value increases as the distance to the border decreases and decreases as the distance from the border increases.

* * * * *